United States Patent [19]

Larson

[11] Patent Number: 5,175,521
[45] Date of Patent: Dec. 29, 1992

[54] MINIATURE DYNAMICALLY TUNABLE MICROWAVE AND MILLIMETER WAVE DEVICE

[75] Inventor: Lawrence E. Larson, Santa Monica, Calif.

[73] Assignee: Hughes Aircraft Company, Los Angeles, Calif.

[21] Appl. No.: 708,530

[22] Filed: May 31, 1991

[51] Int. Cl.$^5$ .................. H01P 7/00; H01P 7/06
[52] U.S. Cl. .................. 333/235; 333/221; 333/232; 333/246; 334/45
[58] Field of Search .............. 333/235, 246, 221, 205, 333/224, 225, 231, 263, 33, 35, 81 A, 105, 232; 334/41, 45, 78; 200/181; 310/309

[56] References Cited

U.S. PATENT DOCUMENTS

| | | | |
|---|---|---|---|
| 4,096,453 | 6/1978 | Rogers | 333/246 X |
| 4,472,690 | 9/1984 | Hallford | 333/35 |
| 4,716,389 | 12/1987 | Gawronski et al. | 333/81 A |
| 4,906,956 | 3/1990 | Kakihana | 333/246 |
| 4,922,253 | 5/1990 | Nathanson et al. | 333/105 X |
| 5,043,043 | 10/1991 | Howe et al. | 310/309 X |

Primary Examiner—Eugene R. LaRoche
Assistant Examiner—Ali Neyzari
Attorney, Agent, or Firm—E. E. Leitereg; W. K. Denson-Low

[57] ABSTRACT

A miniature, electrostatically actuated, variable impedance circuit element which is operably tunable in response to control signals. With integrated circuit, thin film processing a fixed circuit member is fabricated on a substrate and a movable circuit member is fabricated over the substrate and is movable relative to the fixed circuit member in response to electrostatic fields produced at armature tabs when the control signals are selectively applied to rows of control electrodes. Embodiments include a variable capacitor and a variable ring resonator.

18 Claims, 2 Drawing Sheets

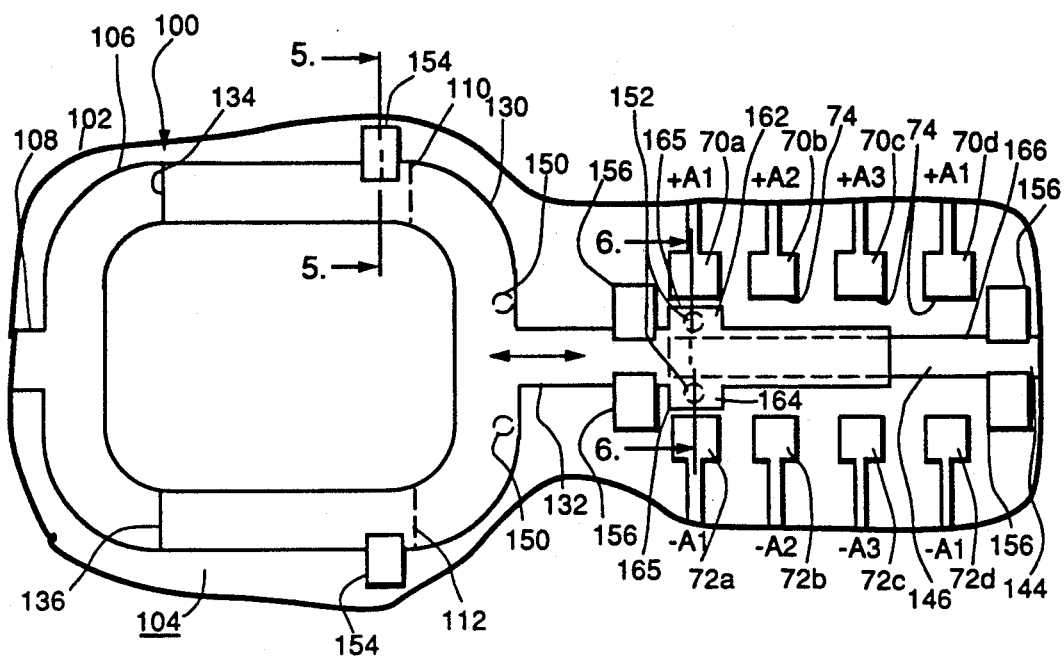
FIG. 4.
FIG. 6.
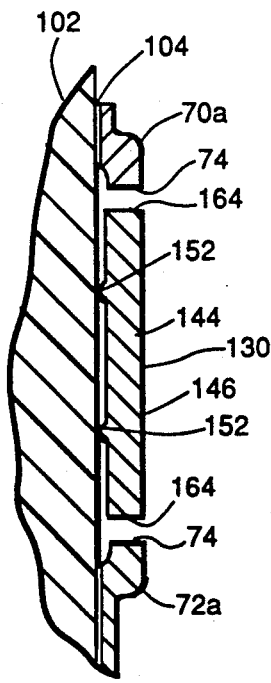
FIG. 5.

MINIATURE DYNAMICALLY TUNABLE MICROWAVE AND MILLIMETER WAVE DEVICE

BACKGROUND OF THE INVENTION

1. Field of the Invention

This invention relates generally to tunable electronics and more particularly to miniature dynamic tunable devices of a type that can be fabricated on integrated circuit substrates.

2. Description of the Related Art

With integrated circuit technology, size and space are a serious constraint on circuit designers. For example, very small dimensioned, thin film transmission lines and circuit elements are fabricated directly onto the surface of a dielectric substrate. Very often these circuit elements have different characteristic impedances than the circuit elements to which they are coupled. It has been difficult to utilize tunable circuit elements for impedance matching because of the small dimensions involved and the density of circuit elements. Thus, such circuit elements have typically been tuned to a fixed impedance match.

Unfortunately, the circuit device impedances change with normal variations in the processed integrated circuit. Consequently, the impedance match can be lost. As a result of the fixed nature of the typical circuit elements, the resulting operating flexibility and performance of the integrated circuit is undesirably affected.

These challenges have often been met by the use of active semiconductor devices for circuit tuning purposes. The use of active semiconductor devices for such tuning is described by I. Bahl and P. Bhartia in *Microwave Solid-State Circuit Design*, John Wiley & Sons (1988), pages 373 through 422. While these types of devices are characterized by their small sizes, they do present other challenges to the circuit designer. For example, they typically introduce significant losses and have limited ranges and power handling capabilities.

With the advent of micro-machining it has been shown that it is feasible to fabricate mechanical and electromechanical devices using thin film integrated circuit technology. Some specific examples are the levers, gears, sliders, and springs referred to in U.S. Pat. No. 4,740,410, issued on Apr. 26, 1988, to R. S. Muller et al., and entitled *Micro Mechanical Elements and Methods for Their Fabrication*. In addition, electro-mechanical devices such as rotatable motors and linear motors are described in U.S. Pat. No. 4,754,185, issued on Jun. 28, 1988 to K. J. Gabriel et al., and entitled *Micro-Electrostatic Motor*.

SUMMARY OF THE INVENTION

In meeting the challenges mentioned above, the present invention is embodied in micro-machined, electrostatically actuated, dynamically tunable circuit devices fabricated on a dielectric substrate of a integrated circuit chip by the use of integrated circuit processing technology. Specifically, the tunable circuits include a fixed circuit member fabricated on the surface of the substrate. In addition, a movable circuit member is fabricated on the substrate such that it can be electromechanically moved relative to the fixed circuit member. The relative movement between these members affects the impedance of the tunable circuit and thereby tunes it to the associated circuit elements to which it is coupled. Various embodiments include, for example, a variable capacitor and a tunable ring resonator.

There are numerous advantages to such dynamically tunable devices. Among them are that they can be batch fabricated on an integrated circuit chip utilizing the same integrated circuit processing techniques that the associated integrated circuits are fabricated with. Thus, at the same time that integrated circuits are being fabricated, miniature dynamically tunable devices can be fabricated that take up very little space on the wafer, add very little weight, and are easily replicated. Moreover, the tunable devices can be positioned closer to the associated circuit elements than would be the case if the tunable devices were positioned off of the wafer, thereby reducing long line effects. In addition, the tunable devices have a wide dynamic range in the microwave and millimeter wave bands and exhibit very little power loss when performing the tuning. Furthermore, the tunable devices can be dynamically tuned electromechanically on the wafer with very low power control signals. The tunable devices are also radiation hardened.

By fabricating such dynamically tunable devices in place on the integrated circuit it is now possible to tune the circuit after fabrication, thereby enhancing the circuit yield of good circuits and thus lowering the manufacturing costs. In addition, the described devices are believed to have wider dynamic ranges and lower insertion losses at microwave and millimeter wave band operation than other known tunable devices.

BRIEF DESCRIPTION OF THE DRAWINGS

FIG. 4 is a top plan view of a variable ring resonator having a fixed ring segment formed on the substrate and a movable ring segment that is operably translated linearly to effectively vary the length of the ring resonator and thus tune it to a selected frequency band;

FIG. 5 is an enlarged cross sectional view of the ring resonator of FIG. 4 taken along the plane 5—5, illustrating the relationship between the movable circuit member, the fixed circuit member and a retaining member; and FIG. 6 is an enlarged cross sectional view of the ring resonator of FIG. 4 taken along the plane 6—6, illustrating the relationship between the movable member, an output line and control electrodes.

DESCRIPTION OF THE PREFERRED EMBODIMENTS

Figures 1, 2, 3:
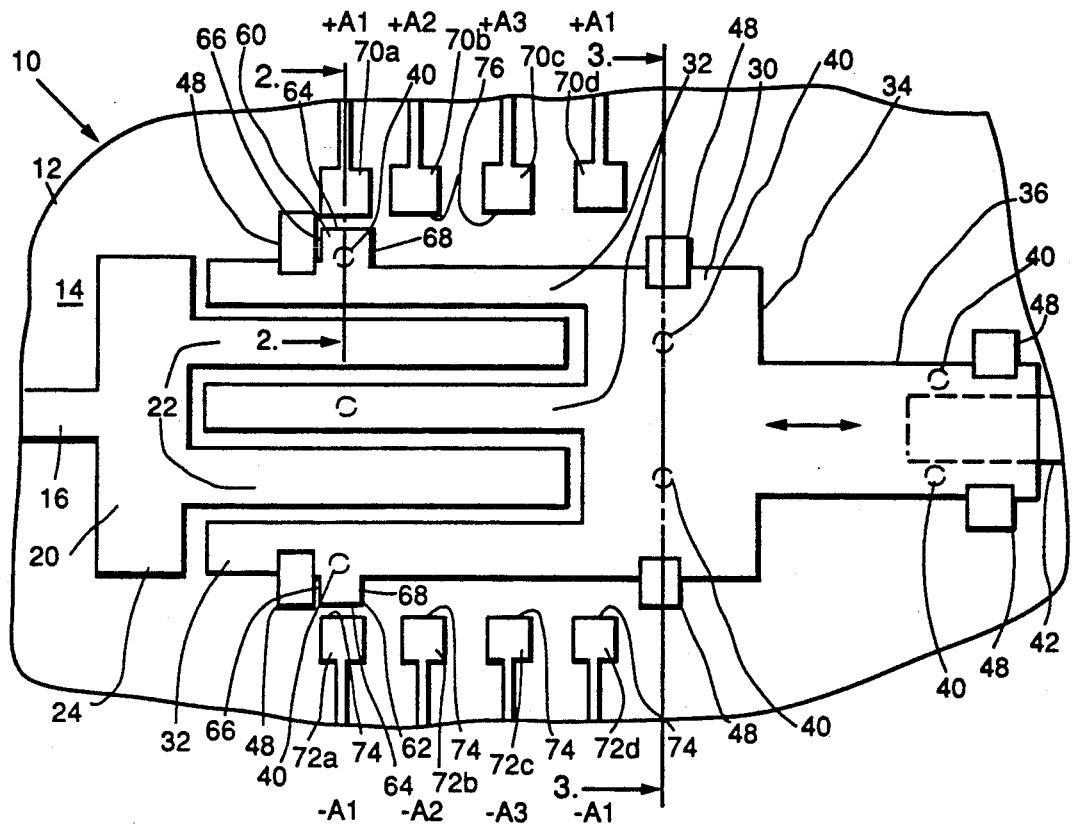
FIG. 1 is a top plan view of a interdigitated variable capacitor including a fixed member and a movable mating member that is operably translated along a linear path by electrostatic forces to vary the capacitance of the capacitor.
FIG. 2 is an enlarged cross sectional view of the variable capacitor of FIG. 1 taken along the plane 2—2, illustrating the relationship between an armature tab on the movable member and a control stator.
FIG. 3 is an enlarged cross sectional view of the variable capacitor of FIG. 1 taken along the plane 3—3, illustrating the relationship between the movable member, the substrate, and a retaining member.

Referring now to the drawings in more detail, as illustrated in the top plan view (not to scale) of FIG. 1, a dynamically tunable variable impedance device configured as a variable capacitor 10 is fabricated on the surface of a substrate 12 utilizing, for example, thin film integrated circuit manufacturing techniques such as the photoresist, masking, deposition, plating, selective etching, and chemical milling techniques described in U.S. patent application Ser. No. 07/608,139, filed on Nov. 1, 1991, by Lawrence E. Larson, and entitled *Micro-Machined Switch & Method Of Fabrication*. Of course, other techniques could also be used to fabricate the tunable device.

Hereinafter when the term "thin film" is used it should be understood to mean films typically deposited by plating, sputtering, evaporation, or vapor deposition and having a typical thickness, by way of example but not limitation, of less than about 10 microns.

The substrate 12 is made of a dielectric and has a smooth, flat surface 14. Preferably the substrate is made of gallium-arsenide since it is an excellent dielectric for microwave and millimeter wave applications, and semiconductor devices and passive circuit components can be fabricated on it. It is believed that other materials such as, for example, silicon, sapphire, or indium-phosphide would be appropriate for certain applications.

An electrical conductor 16 is fabricated on the surface 14 of the substrate 12 using photoresist, masking, selective etching, and thin film metalization processes.

In addition, a fixed capacitor member 20 having a plurality of spaced apart fingers 22 is also fabricated onto the surface 14 in electrical contact with the conductor 16. These fingers 22 are connected together at one end by a web 24 which in turn is connected to the conductor 16. As is best illustrated in FIG. 2, the fingers 22 are rectilinear with the side walls 26 of the fingers 22 being generally planar and disposed parallel to one another and perpendicular to the plane of the surface 14.

Structurally, the conductor 16 and the fixed capacitor member 20 are fabricated from a first thin layer 28 of titanium about 500 Angstroms thick and gold about 4500 Angstroms thick deposited on the surface 14. Titanium is used because it bonds very well to gallium arsenide. A thicker layer 30 of gold, for example, is plated on top of the layer 28. This thicker layer can, for example, be 2 to 3 microns thick and is preferably deposited by electroplating. By way of example, the width of the conductor 16 can be 100 microns, the width of the fingers 22 can be 50 microns and the length of the fingers can be from 300 to 500 microns.

A movable capacitor member 30 having a plurality of spaced apart fingers 32 is fabricated on the surface 14 of substrate 12, again using photoresist, patterned masking, selective etching, and thin film metalization processing. This movable member 30 is configured so that it is not bonded to the substrate 12 or any of the other circuit elements when all of the photoresist is removed but is free to move relative to the fixed capacitor member 20.

The spaced apart fingers 32 are connected together at one end by a web 34 which in turn is connected to an armature 36. The fingers 32 are generally rectilinear, having planar side walls 38 that are parallel to one another and perpendicular to the plane of surface 14. The bottom surface of the fingers 32 which are disposed adjacent to the surface 14 include node like bearings 40 which ride on the surface 14 in low friction contact. These bearings are fabricated with the fingers as a part of the thin film processing previously referenced. This set of fingers 32 is dimensioned generally the same as the set of fingers 22 of the fixed capacitor member 20 and are spaced apart a sufficient distance to allow the two sets of fingers to nest together in an interdigital relationship with an air gap between them. This air gap can, for example, be about 0.5 to about 1.0 micron.

It should be understood that while exemplary dimensions have been given for the fingers 22 and 32 it is possible to increase the maximum capacitance of the variable capacitor 10 by increasing the length of the fingers, by increasing the thickness of the fingers, by increasing the number of fingers, and by decreasing the width of the air gap between the fingers.

The armature 36, which also acts as a conductor, projects from the web 34 along an axis of movement that is parallel to the planes of the fingers 22 and 32. Also disposed on the bottom surface of the armature 36 are two spaced apart bearings 40 that ride on the surface 14 of the substrate in low friction contact. These bearings are spaced apart a sufficient distance and are of sufficient height to allow a conductor 42 disposed on the surfaced 14 to pass therebetween in low friction contact with the armature 36.

The conductor 42 is fabricated on the substrate 12 in the same manner that the electrical conductor 16 is, using the same thin film processing techniques.

In order to retain the movable capacitor member 30 on top of the substrate 12 and to allow its linear low friction movement along to smooth surface 14, retaining clips 48 are disposed along the outer edge of the movable capacitor member 30. As is best illustrated in FIG. 3, these clips 48 include a base 50 that is fabricated onto the surface 14 with the previously referenced thin film processing. Structurally, a base 50 including the thin layer 28 of titanium and gold and a thicker layer of gold and is attached to the surface 14. A tongue 52 also of gold is layered onto the base and is cantilevered to extend over the outer edge on the movable capacitor member 30. An air gap is formed between the surfaces of the retaining clips and the movable capacitor member 30. As a result, the movable capacitor member 30 can be linearly translated across the surface 14 with low fiction.

Linear movement of the capacitor member 30 is limited by armature tabs 60 and 62 disposed on the outer edge of the movable capacitor member 30. Structurally, these tabs 60 and 62 are generally rectilinear and have planar armature faces 64 on their outermost surfaces and planar side walls 66 and 68. These tabs 60 and 62 are positioned such that the sidewalls 66 abut one pair of the clips 48 when the variable capacitor 10 is in a maximum capacitance configuration as illustrated in FIG. 1. Conversely, when the variable capacitor 10 is moved to the right of FIG. 1 to a minimum capacitance configuration, the rightmost pair of retaining clips 48 limit linear travel of the movable capacitor member 30 when the sidewalls 68 of the armature tabs 60 and 62 abut them.

In operation, as the movable capacitor member 30 is translated linearly relative to the fixed member 20 the capacitance between the conductor 16 and the conductor 42 varies in accordance with the amount of meshing between the fingers 22 and 32. In one variable capacitor constructed with seven fingers the capacitance varied from 0.05 to 0.2 pico farads.

Linear translation of the movable capacitor member 30 is effected by electrostatic forces exerted on the armature tabs 60 and 62 by two rows of stator control electrodes 70a-70d and 72a-72d which are respectively disposed along each outer edge of the armature 36.

The two rows of stator control electrodes 70a through 70d and 72a through 72d are disposed along opposite sides of the armature 36 such that the end wall pole face 74 of each stator control electrode is displaced laterally the same distance from the faces 64 of the armature tabs 60 and 62 so that the pole faces 74 and 76 are all disposed in the same two parallel planes. The width and height of these pole faces 74 and 76 are about the same width and height as that of the armature tab face 64, and the spacing between adjacent control elements can, for example, be about the same as the width of the tabs 60 and 62. Control leads connect each of the control electrodes 70a–70d and 72a–72d to a source of control signals (not shown).

Each control electrode 70a through 70d is aligned along separate axes oriented at a right angle to the axis of movement of the armature 36 so that it is in axial alignment with a corresponding one of the control electrodes 72a through 72d respectively on the opposite side of the transmission line and, as a consequence, can be considered a pair with this other control electrode. For example, control electrodes 70a and 72a are considered a pair. As will be explained in more detail with regard to the operation of the variable capacitor, each control electrode pair operably generates an electrostatic field when control signals +A1 and −A1 et seq. of different signal levels are applied to them.

As is best illustrated in FIG. 2, each control electrode such as 70c is fabricated from the thin layer of titanium and gold 20 and the thicker layer of gold that the conductor 16 is fabricated from. The height of the control electrodes above the surface 14 is about the same as the combined thickness of the movable member 30 and the conductor 42. A flange portion 75 projects from the surface 14 of the substrate 12 and holds a control electrode 70a in a "goose neck" configuration such that the pole face 74 or 76 of each stator control electrode is displaced above the surface 14 a distance about equal to the distance that the movable capacitor member 30 is disposed above the surface 14. Consequently, the faces 74 and 76 of each control electrode will be congruent with the end walls 64 of the tabs 60 and 62 when the tabs are in axial alignment with a control electrode pair such as 70a and 72a.

In operation, pairs of control signals: +A1 and −A1; +A2 and −A2; and +A3 and −A3 are sequentially applied to the control electrode pairs 70a–72a, 70b–72b, 70c–72c, etc. In practice, the control signals +A will have a higher voltage potential than the control signals −A. These control signals set up an electrostatic field on each of the control electrodes which develop an electrostatic image charge of opposite polarities relative to each other at each end of the tabs 60 and 62. The electrostatic attraction between the fields of the control electrodes and the charges on the ends of the tabs 60 and 62 effectively translate the movable member 30 along an axis of movement. To move the capacitor member 30 from left to right relative to FIG. 1, the sequence of control signal pairs will be A1, A2, A3, and A1.

In FIG. 1, for example, the tabs 60 and 62 are in alignment with the control electrode pair 70a and 72a. Thus, with a control signal pair sequence A1, A2, A3 the armature tabs 60 and 62 will be effectively stepped to the right to a position in which their axis is in alignment with the stator control electrode pair 70c and 72c. If, however, the movable capacitor member 30 is to be stepped from the far right to the left, the sequence of control signal pairs applied to the stator control electrodes will be reversed to A1, A3, A2, A1. As a result of the electrostatic fields and attractions, the movable capacitor member 30 translates from right to left until the tabs 60 and 62 stop in alignment with the control electrode pair 70a and 72a, as illustrated in FIG. 1.

Finer tuning of the movable capacitor member 30 can also be accomplished in a number of ways. For example, a vernier effect can be attained in which the tabs 60 and 62 can be translated to a position midway between adjacent control electrode pairs. This is done by simultaneously applying two control signals pairs such as +A2 and −A2 to electrodes 70b and 72b, and control signals +A3 and −A3 to electrodes 70c and 72c. The equilibrium point for the electrostatic attraction between the control electrodes and the tabs 60 and 62 is thus between the adjacent control electrode pairs; and consequently the tabs 60 and 62 come to rest midway between these adjacent control electrodes.

Even finer tuning of the movable capacitor member 30 can be performed by selectively applying control signals +A and −A of different amplitudes to adjacent pairs of the control electrodes. As a result, the equilibrium point of the electrostatic field will positioned nearer to one of the adjacent pairs of control electrodes than the other one of the adjacent pairs. For example, if the control signals +A3 and −A3 have a higher amplitude than the control signals +A2 and −A2, the equilibrium point will be closer to the control electrodes to which the higher amplitude control signals +A3 and −A3 is applied.

Another tunable impedance device that incorporates features described above is the tunable ring resonator 100 of FIG. 4. Structurally, the ring resonator is fabricated on a substrate 102 having a smooth flat surface 104 using the integrated circuit processing techniques referenced above. Specifically, a fixed ring segment member 106, having a "U" shaped configuration, is fabricated on the surface 104 with thin films of electrically conductive material. This member is in the general configuration of a part of an oval, with the curved closed end being connected to a conductor 108. The open end terminates in two bifurcated ends 110 and 112, and the segments of the fixed ring segment leading to the ends 110 and 112 are straight.

As illustrated in cross section in FIG. 5, the straight segments have a rectilinear configuration with a smooth planar top surface 114. The fixed ring segment is fabricated of a first thin film layer 116 of titanium about 500 Angstroms thick, and gold about 4500 Angstroms thick deposited directly on the surface 104. Then a thicker layer of electrically conductive material such as gold about 2 to 3 microns thick is deposited on the layer 116. The width of the fixed member is, for example, 100 microns.

A movable ring segment 130 having a "U" shaped configuration is also fabricated over the surface 104 using the previously referenced photoresist, pattern masking, selective etching, and thin film metalization processing. An armature 132 which also acts as an electrical conductor projects from the closed end of the movable ring segment 130. The open end of the ring segment 130 terminates in two bifurcated ends 134 and 136, and the segments of the ring leading to the ends 134 and 136 are straight. Both the fixed ring segment 106 and the movable ring segment 130 are similarly dimensioned and configured so that the straight lengths of movable ring segment 130 are operably superimposed over the straight lengths of the fixed ring segment 106. In operation, the smooth lower surface 138 of ring segment 130 rides over the smooth upper surface 114 of the fixed ring segment 106 in low friction contact and effectively closes the ring.

As illustrated in FIG. 5, the movable ring segment 130 also has a rectangular cross-section and is fabricated from a thin layer of titanium and gold 140 and a thin layer of gold 142, with a total thickness of about 2 to 3 microns.

The armature 132 projects along the axis of movement of the movable ring segment 130 and operably rides over the top surface of a conductor 144 fabricated on the surface 104 of the substrate. This conductor 144 is fabricated similarly to the manner that the fixed ring segment 106 and conductor 108 is, and is similarly dimensioned. The conductor 144 also has a rectangular cross-section and a smooth flat top surface 146. As a result, the projecting armature 132 on the movable ring segment 130 rides across the surface 146 in low friction contact.

In order to maintain the spacing of the movable ring segment 130 above the substrate surface 104 and to permit low friction movement, node like bearings 150 and 152, as are best illustrated in FIG. 6, are disposed in spaced apart relationship on the lower surface of the movable ring segment 130 closest to the surface 104. These bearings are integral with the movable ring segment 130 and are fabricated with it. One pair of these bearings 152 are positioned to straddle the output conductor 144 and restrain lateral motion of the movable ring segment relative to the axis of movement while allowing for low friction contact with the conductor 144.

In order to further restrain motion of the movable ring segment 130 to a linear path and to retain the ring segment over the substrate, three pairs of clips 154 and 156 are fabricated on the substrate 102 at the outer edge of the ring segment 130 and the conductor 144 respectively. As illustrated in FIG. 5, each of the clips includes a base 158 that is fabricated on the substrate surface 104 using the previously referenced thin film process. A flange 160, preferably of gold, projects away from the base and supports one end of a tongue that in turn is cantilevered to extend over the outer edge of the movable ring segment 130. An air gap is formed between the surfaces of the clips and the movable ring segment 130 to allow non-binding, low friction movement.

The total length of linear movement is further limited by the sidewalls of the armature tabs 162 and 164 disposed on the outer edge of the armature 132. Structurally, these tabs are generally rectilinear and have a planar armature face 165 on their outermost surface. These tabs are positioned such that their side walls abut the leftmost pair of the clips 156 when the ring resonator is in its shortest circuit path length configuration, as illustrated in FIG. 4, and abut the other rightmost pair of clips 156 when the movable ring segment moves linearly to the right in FIG. 4 to a maximum path length configuration. An example of the limit on the amount of travel of the armature 132 is 300 microns. Moreover, the length of the resonator ring from the input conductor 108 to the location where the ring contacts the armature 132 can vary from between 300 and 600 microns. Of course, it should be understood that these are exemplar sizes.

Since the general electro-mechanical operation of the tunable ring resonator 100 of FIGS. 4–6 is similar to the operation of the variable capacitor 10 of FIGS. 1-3, the same structural elements are identified with the same reference characters in both sets of Figures. Thus, the operation of shortening and lengthening the resonator ring can be understood by referring to the preceding portion of this detailed description.

In general, however, pairs of control signals $+A1,-A1$ through $+A3,-A3$ are selectively applied to the control electrodes $70a$–$70d$ and $72a$–$72d$ to linearly translate the movable ring segment 130 to selected positions relative to the fixed ring segment 106, to effectively lengthen and shorten the closed circuit path of the ring resonator 100 and thus tune the ring resonator circuit.

Linear translation of the movable ring segment 130 is effected by electrostatic forces exerted on the armature tabs 162 and 164 by two rows of stator control electrodes $70a$–$70d$ and $72a$–$72d$ disposed on each side of the armature 144. Operation of the stator control electrodes is substantially the same as that of the stator control electrodes of FIGS. 1 through 3, and are thus given the same reference characters. Consequently, a detailed explanation can be had by referring back to that part of the description.

As previously stated, all of the embodiments described herein are fabricated by integrated circuit processes using the same described materials. For example, each of the conductors, the tunable circuit element, the control electrodes and the supporting structure are preferably fabricated of electrically conductive materials such as a thin layer of titanium and gold and thicker layers of gold, each patterned on the substrate using layers of photoresist patterned by masking, photoexposure, selective etching, and metalization.

Moreover, while gold is the preferred material for the structural elements, it is believed that other electrically conductive materials can be used. Accordingly it should, by way of example but not limitation, be possible to use stainless steel, doped silicon, and rhodium. Moreover, it should again be possible to use materials other than gallium arsenide for the substrate.

While salient features have been described with respect to particular embodiments, many variations and modifications can be made without departing from the scope of the invention. Accordingly, that scope is intended to be limited only by the scope of the appended claims.

What is claimed is:

1. A miniature, electrostatically actuated, tunable circuit comprising:
   a substrate having a first circuit member disposed at one surface thereof;
   a second circuit member disposed above said substrate, said second circuit member being movable relative to said first circuit member; and
   control means fabricated on said substrate and being operable to selectively receive control signals for producing electrostatic fields which are coupled to said second circuit member, the electrostatic fields being operable to selectively move said second circuit member relative to said first circuit member and operably tune said tunable circuit.

2. The miniature, electrostatically actuated, tunable circuit of claim 1 in which said control mean is disposed with an air gap that is sufficiently narrow such that the control means will induce an image charge on said second circuit member to enhance electrostatic attraction.

3. The miniature, electrostatically actuated, tunable circuit of claim 1 in which said control means includes a plurality of separate control electrodes distributed on at least one side of said second circuit member.

4. The miniature, electrostatically actuated, tunable circuit of claim 3 in which said separate control electrodes are distributed alongside of said second circuit member and are operable to move said second circuit member linearly to operably tune said turnable circuit.

5. The miniature, electrostatically actuated, tunable circuit of claim 4 in which said first and said second circuit member includes a plurality of spaced apart finger members in which said finger member of said first circuit member interdigitally mate with said finger members of said second circuit member to effect the capacitance of said tunable circuit.

6. The miniature, electrostatically actuated, tunable circuit of claim 5 in which said finger members are parallel to each other and have planar side walls.

7. The miniature, electrostatically actuated, tunable circuit of claim 4 in which said first circuit member includes a first segment of a ring and said second circuit member includes a second segment of a ring that compliments said first segment, said second segment being operable to slide along a surface of said first segment of a ring to form a closed ring which is operable as a ring resonator.

8. The miniature, electrostatically actuated, tunable circuit of claim 7 in which said first and said second segments of a ring have individual linear portions that are in sliding contact with each other.

9. The miniature, electrostatically actuated, tunable circuit of claim 2 in which said second circuit member includes at least one tab projecting from a side wall thereof, said tab being operably electrostatically attracted by the electrostatic fields produced by said control electrodes.

10. The miniature, electrostatically actuated, tunable circuit of claim 1 in which said first and said second circuit members have a rectangular cross section.

11. The miniature, electrostatically actuated, tunable circuit of claim 9 in which said first and said second circuit members have a rectangular cross section.

12. The miniature, electrostatically actuated, tunable circuit of claim 1 in which said first and said second circuit members are fabricated of thin films.

13. The miniature, electrostatically actuated, tunable circuit of claim 1 in which said control means are fabricated of thin films.

14. The miniature, electrostatically actuated, tunable circuit of claim 1 in which said substrate is a material from the group consisting of gallium-arsenide, indium phosphide, and sapphire.

15. The miniature, electrostatically actuated, tunable circuit of claim 1 in which said first and said second circuit members each comprise a layer of gold.

16. The miniature, electrostatically actuated, tunable circuit of claim 1 in which said control means comprises a layer of gold.

17. The miniature, electrostatically actuated, tunable circuit of claim 1 in which said first and said second circuit members and said control means comprise a thin layer of titanium and gold and a thicker layer of gold.

18. A miniature, electrostatically actuated, circuit element comprising:
a substrate having a first circuit element fixed thereto;
a second circuit element having a surface member and which is movable relative to said first circuit element; and
control means including control electrodes each having planar faces that are disposed in parallel planes and which match said surface member with an air gap there between and to allow said second circuit element to move through the region beside said control electrodes and to operably effect electrostatic attraction between said control electrodes and an image charge on said surface member in response to a control signal applied to said control electrode.

* * * * *

UNITED STATES PATENT AND TRADEMARK OFFICE
CERTIFICATE OF CORRECTION

PATENT NO. : 5,175,521
DATED : December 29, 1992
INVENTOR(S) : L. E. LARSON It is certified that error appears in the above-identified patent and that said Letters Patent is hereby corrected as shown below:

Col. 8:
Claim 2, line 62, delete "mean" and insert instead --means--;
Col. 9:
Claim 4, line 7, delete "turnable" and insert instead --tunable--; and
Col. 10:
Claim 18, line 33, delete "there between" and insert instead as one word --therebetween--.

Signed and Sealed this

Tenth Day of January, 1995

*Attest:*

BRUCE LEHMAN

*Attesting Officer*     Commissioner of Patents and Trademarks